(12) United States Patent
Balan et al.

(10) Patent No.: US 11,646,863 B2
(45) Date of Patent: May 9, 2023

(54) EQUALIZATION ADAPTATION SCHEMES FOR HIGH-SPEED LINKS

(71) Applicant: NVIDIA Corporation, Santa Clara, CA (US)

(72) Inventors: Vishnu Balan, Saratoga, CA (US); Mohammad Mobin, Murphy, TX (US); Akshay Shyam Pavagada Raghavendra, San Jose, CA (US); Pervez Mirza Aziz, Dallas, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/499,300

(22) Filed: Oct. 12, 2021

(65) Prior Publication Data

US 2023/0109793 A1    Apr. 13, 2023

(51) Int. Cl.
| | |
|---|---|
| *H04B 1/10* | (2006.01) |
| *H04L 7/00* | (2006.01) |
| *H04L 25/03* | (2006.01) |
| *H04L 7/06* | (2006.01) |

(52) U.S. Cl.
CPC .......... *H04L 7/0058* (2013.01); *H04L 7/0079* (2013.01); *H04L 7/0091* (2013.01); *H04L 7/06* (2013.01); *H04L 25/03006* (2013.01); *H04L 25/03878* (2013.01); *H04L 2025/03611* (2013.01)

(58) Field of Classification Search
CPC ... H04L 7/0058; H04L 7/0091; H04L 7/0079; H04L 25/03878; H04L 25/03006; H04L 7/06; H04L 2025/03611; H04L 25/03343; H04L 25/03885; H04B 17/309

USPC ................................. 375/331–333, 350, 348
See application file for complete search history.

(56) References Cited

U.S. PATENT DOCUMENTS

| | | | | |
|---|---|---|---|---|
| 9,025,655 | B1 * | 5/2015 | Ramadoss | H04L 25/03885 375/232 |
| 10,728,061 | B2 * | 7/2020 | Lee | H04L 25/03343 |
| 2014/0029651 | A1 * | 1/2014 | Zhong | H04B 17/309 375/295 |

OTHER PUBLICATIONS

Song, S. et al. "System Level Optimization for High-Speed SerDes: Background and the Road Towards Machine Learning Assisted Design Frameworks," MDPI, Electronics, Oct. 28, 2019, 15 pages.

(Continued)

*Primary Examiner* — Phuong Phu
(74) *Attorney, Agent, or Firm* — Lowenstein Sandler LLP

(57) ABSTRACT

A receiving link device includes a receiver (RX) to receive a data signal from a transmitting link device, the receiver including an equalizer to detect RX tap values and a processing device coupled to the receiver, the processing device to perform operations including: programming the receiver with information related to target RX tap values that are associated RX pre-cursors or RX post-cursors; detecting, using the equalizer, that an RX pre-cursor value is greater or less than a target RX tap value; generating, based on the detecting, a tap message including an up or a down command to decrease or increase a corresponding transmitter (TX) pre-cursor value of the transmitting link device; and causing the tap message to be provided to a local transmitter to be transmitted to a remote receiver of the transmitting link device, which causes the transmitting link device to adjust the corresponding TX pre-cursor value.

20 Claims, 11 Drawing Sheets

(56) References Cited

OTHER PUBLICATIONS

Sun, Phil, "100Gb/s Single-lane SERDES Discussion," Credo Semiconductor, Jan. 2018, 22 pages.
Telian, Donald, "Serial Link Equalization Primer," SiSoft, Jan. 14, 2020, retrieved from https://www.sisoft.com/blog/posts/serial-link-equalization-primer.html, 10 pages.
Telian, D. et al., "New SI Techniques for Large System Performance Tuning," DesignCon 2016, 25 pages.
Willis, K. et al. "Backchannel Modeling and Simulation Using Recent Enhancements to the IBIS Standard," Cadence, 2019, 13 pages.
Zheng, K. et al., "Feedforward Equalizer Location Study for High-Speed Serial Systems," Signal Integrity Journal, May 21, 2019, 21 pages.

* cited by examiner

800

```
┌─────────────────────────────────────────────┐
│ Program a receiver (RX) of a receiving link │
│ device with information related to target   │
│ RX tap values that are associated with at   │
│ least one of RX pre-cursors or RX post-     │
│ cursors.                                    │
│ 810                                         │
└─────────────────────────────────────────────┘
                      │
                      ▼
┌─────────────────────────────────────────────┐
│ Detect, device using an equalizer of the    │
│ receiver, that an RX pre-cursor value       │
│ derived from a data signal received from a  │
│ transmitting link device is one of greater  │
│ or less than a target RX tap value.         │
│ 820                                         │
└─────────────────────────────────────────────┘
                      │
                      ▼
┌─────────────────────────────────────────────┐
│ Generate, based on the detecting, a tap     │
│ message comprising one of an up or a down   │
│ command to one of decrease or increase a    │
│ corresponding transmitter (TX) pre-cursor   │
│ value of the transmitting link device.      │
│ 830                                         │
└─────────────────────────────────────────────┘
                      │
                      ▼
┌─────────────────────────────────────────────┐
│ Cause tap message to be provided to a local │
│ transmitter to be transmitted to a remote   │
│ receiver of the transmitting link device,   │
│ wherein the tap message to cause the        │
│ transmitting link device to adjust the      │
│ corresponding TX pre-cursor value.          │
│ 840                                         │
└─────────────────────────────────────────────┘
```

FIG. 8

EQUALIZATION ADAPTATION SCHEMES FOR HIGH-SPEED LINKS

TECHNICAL FIELD

At least one embodiment pertains to processing resources used to perform equalization over a high-speed serial link. For example, at least one embodiment pertains to technology for receiver equalization-directed transmitter finite impulse response adaptation.

BACKGROUND

Serial links involve high-speed data communication between serializer-deserializer (SerDes)-based devices, which employ data equalization to enable increasingly higher data rates. A current serial link uses a SerDes on each end of the link, each with its own Transmitter (TX) and Receiver (RX). By definition, the two SerDes are in different components, e.g. a transmitting serial link device and a receiving serial link device, and hence have differing amounts and types of equalization. While some serial standards specify minimum TX and RX capabilities, components typically provide more equalization than required, particularly within the transmitting link device. Further, lack of standardization has introduced a variety of equalizations implementations, which has caused equalization to become complicated and costly to implement. Not providing sufficient equalization, however, risks errors in data transmission and providing too much equalization can cause noise to threaten data transmission.

BRIEF DESCRIPTION OF DRAWINGS

Various embodiments in accordance with the present disclosure will be described with reference to the drawings, in which:

FIG. 8 is a flow diagram of a method for tap coefficient RX equalization-directed TX FIR response adaptation, in accordance with at least some embodiments.

DETAILED DESCRIPTION

Figure 1A:
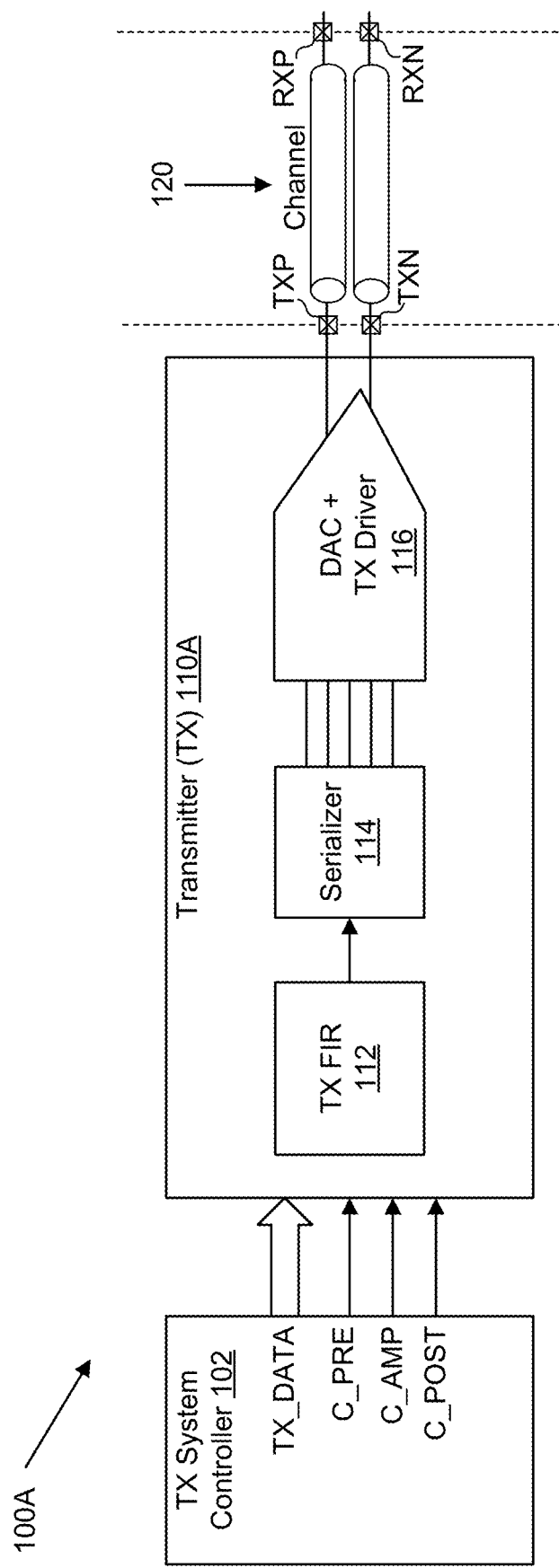
FIG. 1A is a schematic block diagram of a transmitting (TX) link device that communicates over a channel having a positive link and a negative link, in accordance with at least some embodiments.

Aspects and embodiments of the present disclosure address the above mentioned complexities and other challenges with serial link communication by training the TX link device with the RX link device based on data signals received by the RX link device from the TX link device, e.g., by the RX link device sending messages with up and down commands to the TX link device that direct the TX link device to adjust amplitude and TX cursor (e.g., tap) gradient calculations. When done iteratively, this training converges to programmed target threshold values at which point training can be terminated to save on power or remain resistant to noise. Advantageously, the present SerDes-related devices and adaptation schemes can be performed without knowledge of explicit tap-by-tap gradient calculations performed by the TX link device, which can be configured to prioritize adaptation based on received training messages.

In at least some embodiments, the TX link device initially detects an amplitude of an incoming data signal received from the RX link device as a means for detecting a short low-loss channel or a long high-loss channel. The RX link device can then instruct the remote TX link device to adjust a launch amplitude of the data signal that is suitable for the RX link device, e.g., based on a comparison to a target amplitude stored in the RX link device. This amplitude adaptation can be performed until converging to the target amplitude or to a target amplitude range, for example.

More specifically, the RX link device can include a controller and/or an RX adaptation-assistive microcontroller (e.g., processing device) that performs operations including retrieving a target amplitude associated with a main cursor of the data signal and determining that the amplitude of the main cursor is one of greater or less than the target amplitude. The operations can further include generating an amplitude message including one of an up or a down command in response to the amplitude being greater or less than the target amplitude, respectively. The operations can further include causing the amplitude message to be provided to a local transmitter to be transmitted to a remote receiver of the TX link device. In these embodiments, the amplitude message causes the TX link device to adjust an amplitude of a transmitted data signal based on the up or down command.

Further, according to at least some embodiments, after amplitude adaptation, the RX link device uses local receiver RX cursor information (e.g., pre-cursor values or post-cursor values) to adjust finite impulse response (FIR) tap values of the remote TX link device. These pre-cursor values or post-cursor values can be detected using an equalizer, e.g., at least one of a feed-forward equalizer (FFE), a decision feedback equalizer (DFE), or a decision feed-forward equalizer (DFFE). Disclosed algorithmic approaches can balance the remote TX FIR and local RX taps contributions to a programmed level, e.g., derived from programmed information within the RX link device related to RX tap values that are associated with at least one of RX pre-cursors or RX post-cursors.

More specifically, the processing device can further perform operations including detecting, using the equalizer, that an RX pre-cursor value is one of greater or less than a target RX tap value associated with or corresponding to the RX pre-cursor value. The operations can further include generating, based on the detecting, a tap message including one of an up or a down command to one of decrease or increase a corresponding transmitter (TX) pre-cursor value of the TX link device. The operations can further include causing the tap message to be provided to a local transmitter to be transmitted to a remote receiver of the TX link device. In these embodiments, the tap message causes the transmitting link device to adjust the corresponding TX pre-cursor value. Thus, the RX pre-cursor value can be one of a first RX pre-cursor value (FM1), a second RX pre-cursor value (FM2), a third RX pre-cursor value (FM3), and so forth, and the corresponding TX pre-cursor value can be a first TX pre-cursor value (CM1), a second TX pre-cursor value (CM2), or a third TX pre-cursor value (CM3), and so forth, respectively.

According to these embodiments, from the knowledge of current RX tap values and target RX tap values, the RX link device can also send many back-to-back remote TX FIR updates (e.g., up/down commands) without having to readapt the entire RX link device when RX tap values are far from the target RX tap value, thus saving initial acquisition time. On the other hand, these embodiments reduce back-to-back TX FIR updates when the RX tap values are close to the target RX tap value, thus avoiding TX FIR tap undershoot or overshoot. This TX and RX tap adjustment approach implicitly eliminates convergence detection issues required in classical least-mean squares, or LMS-based back channel adaption schemes. In this approach, convergence can be achieved when the RX tap values reach the target RX tap value that is programmed into the RX link device. The TX FIR up/down adaptation can conditionally be stopped when the sum of the absolute RX pre-tap and post-tap values exceeds a given fraction of a main tap value of the RX equalizer so that the launched direct voltage (DC) level of the TX amplitude does not fall too low and become sensitive to noise.

Therefore, advantages of the systems and methods implemented in accordance with some embodiments of the present disclosure include, but are not limited to, implementation of a straight-forward solution to a complex RX adaptation problem that conventionally would include many loops and power-consuming adaptation. The advantages further include employing an RX FFE/DFE/DFFE and TX FIR equalization training scheme that requires no additional algorithm for corresponding TX adaptation. Further, by employing the disclosed training algorithms implemented by the RX link device, adaptation coupling issues can be avoided. Additionally, the disclosed systems and methods offer balancing the RX power versus TX power consumption based on the target application requirements. Further, back channel adaptation can potentially reduce TX output so low that the transmitted data signal from the TX link device can become sensitive to noise and crosstalk. The disclosed embodiments includes operations to terminate the adaptation training when the RX link device detects main tap energy contribution is reduced below a target ratio with respect to the pre and post cursor contribution. Other advantages will be apparent to those skilled in the art of serial data link communication discussed hereinafter.

FIG. 1A is a schematic block diagram of a transmitting (TX) link device 100A that communicates over a channel 120 having a positive link and a negative link, in accordance with at least some embodiments. The TX link device 100A can include, for example, a TX system controller 102 coupled to a transmitter, e.g., TX 110A, which in turn is coupled to positive and negative links of a channel over which the TX link device 100A communicates data signals to an RX link device 100B (see FIGS. 1B-1C). To do so, the TX system controller 102 can provide transmission data (TX_DATA) to the TX 100A as well as information that includes up/down commands associated with pre-cursor values (C_PRE), amplitude values (AMP), and post-cursor values (C_POST), to which will be referred in more detail.

Figure 1B:
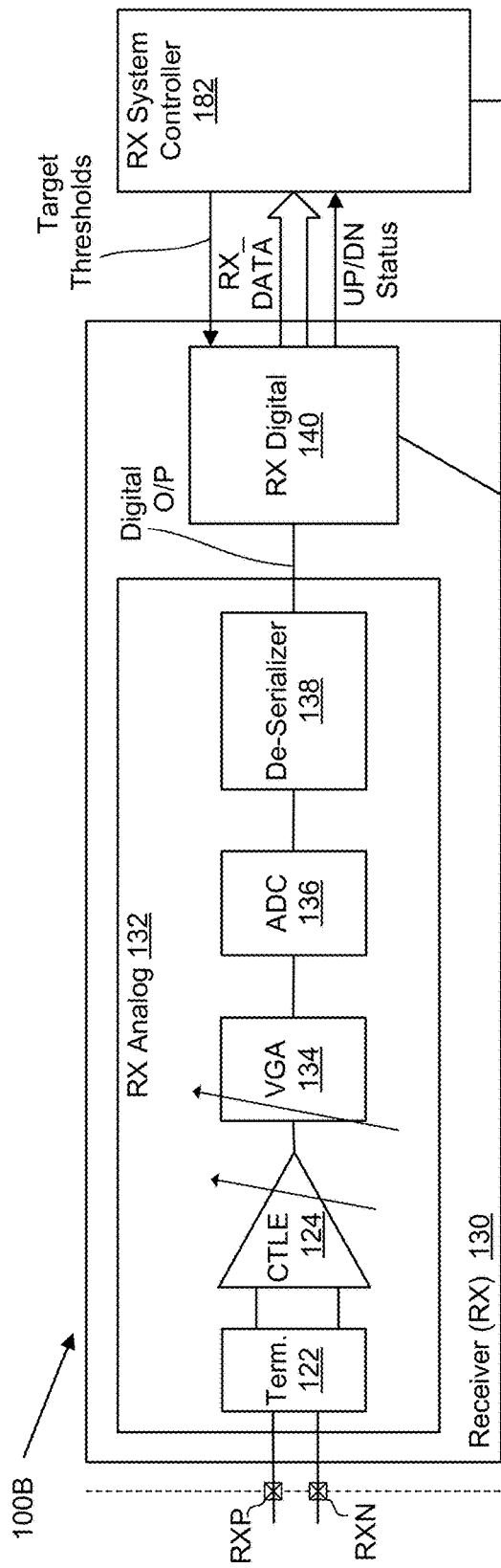
FIG. 1B is a schematic block diagram of a receiving (RX) link device that communicates over the channel, in accordance with at least some embodiments.
Figure 1C:
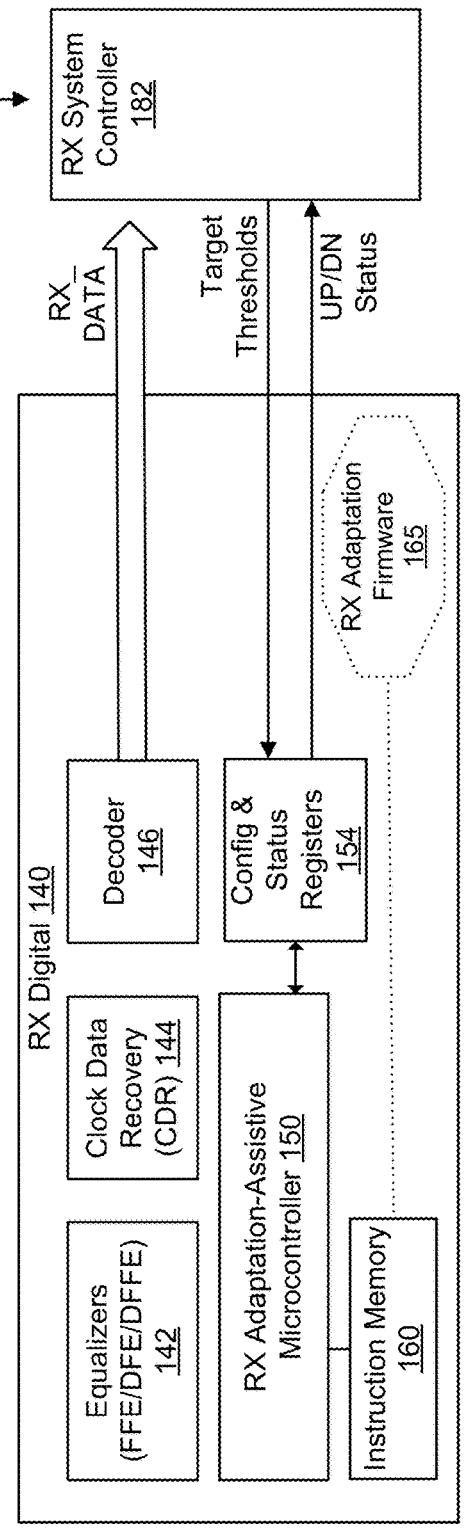
FIG. 1C is a schematic block diagram of the RX digital subsystem of the receiving link device of FIG. 1B, in accordance with at least some embodiments.

In disclosed embodiments, FIGS. 1A-1C illustrate a high-level overview of components used in the TX and RX link devices 100A and 100B that assist with the training and functioning of a high-speed serial link. Combining equalization at both the TX and RX link devices enable a more effective high-bandwidth data transmission capable of delivering a stable throughput over a lossy channel. Hence data equalization can be performed both inside the TX link device 100A and the RX link device 100B.

With additional reference to FIG. 1A, and according to at least some embodiments, the TX 110A includes a TX FIR 112, a serializer 114, and a digital-to-analog converter (DAC) and TX driver, e.g., DAC & TX driver 116. In these embodiments, the TX FIR 112 implements the TX equalization to invert some of the Inter-Symbol Interference (ISI) effects from the channel 120. The equalization (FFE/DFE/DFFE) that is performed at the TX modifies the signal amplitudes surrounding the transitions of the data signal. The TX equalization schemes, for example, can boost the signal strength of the high frequency components and attenuate the signal strength of the low frequency components. This adaptation is performed to counter the low pass filter response of the channel 120. The channel effects cause the total energy associated with any data symbol (main cursor) to spread into the neighboring symbols, both into the previous and subsequent symbol times (pre-cursors and post-cursors). To maintain an optimized swing on the data signal through equalization, an estimate of the energy spread is can be calculated as tap-coefficient values.

In various embodiments, the RX link device 100B assists with the search for the best tap coefficient values using back-channel adaptation schemes that will be discussed in more detail. In at least some embodiments, C_AMP control depends on the fraction of energy at the pre-cursors and post-cursors and energy required to compensate for the channel losses. The tap coefficients, C_PRE and C_POST of the TX link device 100A can be determined from the strength of the destination RX equalization co-efficient of the RX link device 100B, as will be discussed in more detail.

In at least some embodiments, the serializer 114 is configured to serialize equalized digital data from the TX FIR 112. The order of the serializer 114 and the TX FIR 112 can be swapped based on the architectural implementation in varying embodiments. Further, the DAC of the DAC & TX Driver 116 converts the digital, serialized data from the serializer 114 into appropriate analog voltage waveform for the TX driver to transmit over the channel 120. The TX driver of the DAC &TX driver 116 assists with the transmission of the signal on the channel. The TX driver can ensure optimum power is delivered to the signal sent across the channel for the RX link device 100B to effectively recover the clock and data information. In these embodiments, the TX system controller 102 is configured with appropriate values of the pre-cursor, post-cursor, and main cursor tap values of the TX FIR 112 based on the tap messages obtained from the controller of the RX link device 100B, which will be discussed in more detail.

FIG. 1B is a schematic block diagram of a receiving (RX) link device 100B that communicates over the channel 120, in accordance with at least some embodiments. In these embodiments, the RX link device 100B includes a receiver, e.g., RX 130 that receives the data signals over the channel 120 and an RX system controller 180 coupled to the RX 130. In various embodiments, the RX 130 further includes, but is not limited to, an RX analog subsystem 132 coupled with an RX digital subsystem 140, which in turn is coupled with the RX system controller 180. In these embodiments, the RX analog subsystem 132 includes, but is not limited to, a termination circuit 122, a continuous-time linear equalizer or CTLE 124, a variable gain amplifier or VGA 134, an analog-to-digital converter or ADC 136, and a de-serializer 138. In various embodiments, the RX analog subsystem 132 is implemented as an integrated circuit, as a connected group of components or circuits, or as an analog device.

In at least some embodiments, the termination circuit 122 is configured to minimize the data insertion loss at the input of the RX 130 and to optimize the received signal power of the data signal receives from the TX link device 100A. The termination circuit 122 can be adapted with a setting that is programmable as part of the RX adaptation cycle. The CTLE 124 is applied at the front-end of the RX link device 100B as a linear peaking filter that compensates for the distortions on the data signal resulting from the lossy channel 120. The CTLE 124 can be composed of several stages of amplitude and frequency boost settings. These stages can be adapted to obtain an optimized setting that can attenuate low frequency components and boost the high frequency components around the Nyquist frequency. The adaptation of the CTLE stages can be performed as a part of the RX adaptation cycle.

In these embodiments, the VGA 134 normally follows the CTLE stage and provides an adaptive variable gain to the input data signal. The VGA 134 can help to maintain an overall amplitude regulation in the RX link device 100B. The amplified signal from the VGA output is applied to the input of the ADC 136 or any other data-digitizing circuit that generates digital information for the subsequent downstream logic stages. In these embodiments, the ADC 136 digitizes the data signal and the de-serializer 138 de-serializes the digital data for further digital processing inside the logic stages, e.g., by the RX digital subsystem 140, which is discussed in detail with reference to FIG. 1C.

FIG. 1C is a schematic block diagram of the RX digital subsystem 140 of the receiving link device of FIG. 1B, in accordance with at least some embodiments. In these embodiments, the RX digital subsystem includes, but is not limited to, one or more equalizer 142, a clock data recovery circuit or CDR 144, a decoder 146, an RX adaptation-assistive microcontroller 150, a set of configuration and status registers, e.g., registers 154, and instruction memory 160 storing RX adaptation firmware 165. In various embodiments, the RX digital subsystem 140 is implemented as an integrated circuit, as a connected group of circuits, or as a processing device.

In at least some embodiments, the equalizer 142 is a digital equalizer that includes at least one of a feed-forward equalizer (FFE), a decision feedback equalizer (DFE), or a decision feed-forward equalizer (DFFE). These equalization schemes compute multiple tap coefficients. In some embodiments, the equalizer 142 equalizes the ISI contribution from the pre-cursors and post-cursors onto the current data symbols using the computed weight of each tap coefficient. These coefficient values are computed during the RX adaptation cycle. Further, the CDR 144 can be used to recover the sampling clock from the data and lock the sampling clock to the data input phase and frequency.

In various embodiments, the RX adaptation-assistive microcontroller 150 simplifies and assists with the controllability and sequencing of multiple operations during the RX adaptation and data recovery processes. In some embodiments, an instruction suite from the firmware 165 enables the microcontroller 150 to sequence and control the training operations occurring internal to the RX 130. The firmware written for the RX adaptation is stored as low-level instructions inside the instruction memory 160. Some known adaptation algorithms are used to obtain the CTLE settings and the tap values for RX feed-forward or feedback coefficients. In at least some embodiments, the controller 182 and the RX adaptation-assistive microcontroller 150 can be referred to jointly as a "processing device," each performing at least some of the adaptive training operations discussed herein related to the RX link device 100B.

In at least some embodiments, the decoder 146 broadly employs decoder stages having data decoding logic to retrieve the final data from the receiver. The decoder 146 output can be further transmitted to the downstream framer stages for further processing. Further, the registers 154 can assist with programming different parameters in the RX hardware to assist with training and functional operation modes. The registers 154 can further provide status information for any external software program or external controller(s) to read into the link training or functional status of the RX link device 100B. This status information can include up or down commands or messages, such as those referred to hereinafter.

In various embodiments, the RX system controller 182 is configured to program configuration settings and any target threshold values that guide the adaptation process during link-up. The controller 182 also receives or reads certain internal status messages generated by the RX 130 and assists with protocol-specified link training sequences. Further, up/down information about the remote TX amplitude and tap co-efficient settings can be sent through the in-band traffic to the RX system controller 182.

Figure 2:
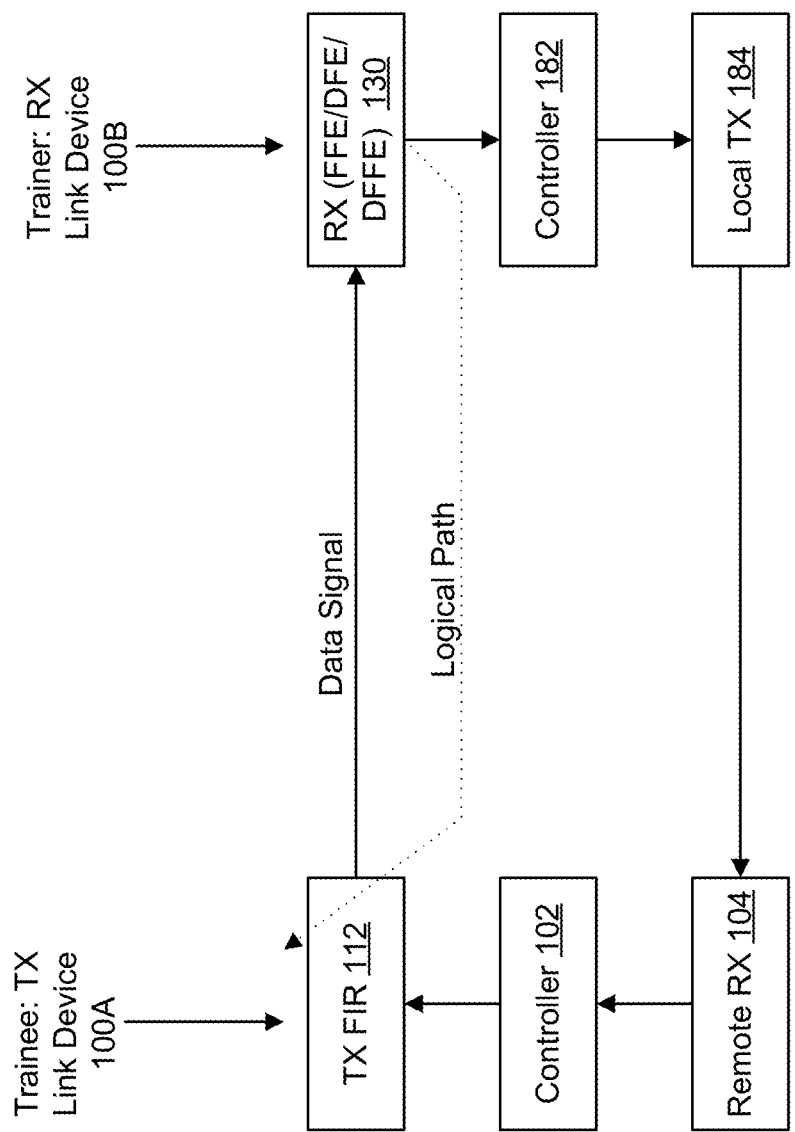
FIG. 2 is a simplified block diagram of the RX link device communicating with the TX link device to train the TX link device to perform equalization adaptation, in accordance with at least some embodiments.

FIG. 2 is a simplified block diagram of the RX link device 100B communicating with the TX link device 100A to train the TX link device 100A to perform equalization adaptation, in accordance with at least some embodiments. The RX link device 100B can therefore be understood to perform operations as a trainer and can be referred to as the local device for training purposes. The TX link device 100A can therefore be referred to as the trainee and can be referred to as the remote device for training purposes. In at least some embodiments, the RX link device 100B therefore further includes a local transmitter or local TX 184 and the TX link device 100A further includes a remote receiver, e.g., remote RX 104. A logical path can be understood to exist direct between the RX 130 of the RX link device 100B and the TX FIR 112 of the TX link device 100A, as these are allowed to communicate via handshake protocol as will be explained. In these embodiments, the trainer RX link device 100B can perform full RX VGA, CTLE, RX FEE/DFE/DFFE adaptation with a focus on training the TX FIR 112.

In various embodiments, the controller 182 programs the RX 130 with information related to target RX tap values that are associated with amplitude and at least one of RX pre-cursors or RX post-cursors. This information can include, for example, various target threshold values or threshold value ranges that the RX 130 can use, together with the controller 182, to train the TX FIR 112. In other words, the target threshold values/ranges can be related to, in additional to signal amplitude, various feed-forward or feedback equalization coefficients of the RX link device 100B that impact corresponding TX finite impulse response (FIR) coefficients of the TX link device 100A. Thus, at least some of these target threshold values/ranges include a target amplitude (or amplitude range) of the main cursor of the data signal received by the RX link device 100B from the TX link device 100A. At least some additional target threshold values/ranges include a first target tap value (FM1), a second target tap value (FM2), a third target tap value (FM3), and optionally additional target tap values or target tap value ranges to which the RX 130 is programmed to work toward reaching during training. These target threshold values/ranges can be stored or programmed into the configuration registers 154 of the RX digital subsystem 140.

More specifically related to amplitude adaptation, if the RX link device 100B is close to the TX link device 100A, the data signal can be very high and cause saturation, for example. Or, in contrast, if the RX link device 100B is far away from the TX link device 100A, the data signal can be very low and difficult to detect. Thus, part of information sent by the RX 130 to the TX FIR 112 can be an amplitude adjustment command. In some embodiments, the RX 130 performs trainee TX amplitude adjustment until the VGA 134 comes to the target amplitude associated with the main cursor of the data signal. For example, the RX 130 can determine the height or amplitude information detected within the data signal using Z, quadrature amplitude modulation (QAM), or other modulation or peak detection technique to detect amplitude. The target amplitude could be, for example, 1V, 1.5V, 2.0V, or the like depending on system architecture.

In various embodiments, if the detected amplitude is too far from the target amplitude, the RX 130 (e.g., the microcontroller 150) determines whether the amplitude is one of greater or less than the target amplitude and provides up or down instructions to the controller 182 to decrease or increase the TX amplitude of the data signal. For example, the RX 130 can generate an amplitude message including one of an up or a down command in response to the amplitude being greater or less than the target amplitude, respectively, e.g., where an up command causes a greater negative number and a down command causes a smaller negative number (although the opposite can be true when using positive numbers). The controller 182 can then encapsulate the amplitude message with a protocol packet the controller 182 sends to the local TX 184. The local TX 184 transmits the protocol packet to the remote RX 104, which can de-encapsulate and parse the protocol packet to provide the up or down command to the controller 102 of the TX link device 100A. As described previously, the controller 102 can then use the up or down command to direct the TX 110A of the TX link device 100A to adjust the amplitude at which the DAC & TX driver 116 are driving the data signal. As this is done iteratively, once the detected amplitude of the data signal either reaches or is within a predetermined percentage of the threshold amplitude, the RX link device 100A can cease amplitude adaptation.

More specifically related to cursor (or tap) adaptation, the RX link device 100B (e.g., the RX digital subsystem 140) can derive RX pre-cursor (and post-cursor) values from the de-serialized data signal. The microcontroller 150 can also retrieve programmed target TX tap values for training comparison purposes. The microcontroller 150 can further detect, using the equalizer 142, that an RX pre-cursor value is one of greater or less than a target RX tap value. The microcontroller 150 can further generate, based on the detecting, a tap message including one of an up or a down command to one of decrease or increase a corresponding TX pre-cursor value of the transmitting link device. In various embodiments, the RX pre-cursor value is one of a first RX pre-cursor value (FM1), a second RX pre-cursor value (FM2), a third RX pre-cursor value (FM3), and so forth, and the corresponding TX pre-cursor value can be a first TX pre-cursor value (CM1), a second TX pre-cursor value (CM2), or a third TX pre-cursor value (CM3), and so forth, respectively. The microcontroller 150 can also provide the tap message to the controller 182 for the controller 182 to encapsulate the tap message in a protocol packet that is provided to the local TX 184.

In at least some embodiments, the local TX 184 transmits the protocol packet to the remote RX 104, which can de-encapsulate and parse the protocol packet to provide the up or down command to the controller 102 of the TX link device 100A. The controller 102 can then use the up or down command to direct the TX 110A of the TX link device 100A to adjust the TX pre-cursor (or post-cursor) value, e.g., CM1, CM2, or CM3, enabling the TX FIR 112 to adapt or adjust timing of releasing data to be transmitted according to the up or down command. As this is done iteratively, once the detected RX pre-cursor (or post-cursor) value of the data signal either reaches or is within a predetermined percentage of the target RX tap value, the RX link device 100A can cease TX FIR tap adaptation for that particular RX pre-cursor (or post-cursor) value.

In various embodiments, the RX link device 100B can repeat the TX FIR tap adaptation for each of any of the first pre-cursor value (FM1), the second pre-cursor value (FM2), and the third pre-cursor value (FM3), and so forth, as well as for each of any of the first post-cursor value, second post-cursor value, the third post-cursor value, and so forth. For example, a processing device of the RX link device 100B can further perform operations include detecting, using the equalizer 142, that an RX post-cursor value is one of greater or less than a second target RX tap value, generating a second tap message including an up or a down command to one of decrease or increase a corresponding TX post-cursor value of the TX link device 100A, and causing the second tap message to be provided to the local transmitter (e.g., local TX 184) to be transmitted to the remote receiver (e.g., remote RX 104) of the TX link device 100A.

Figure 3A:
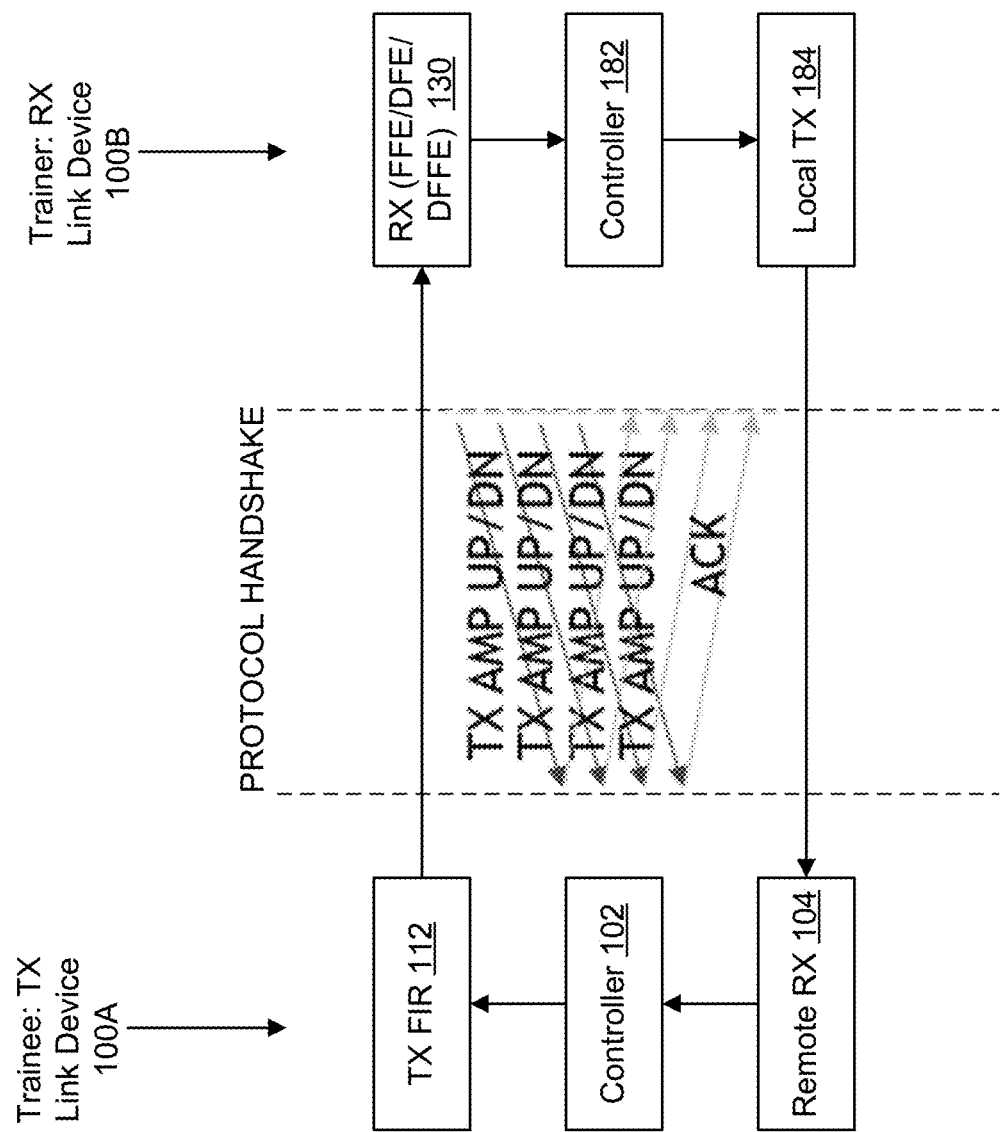
FIG. 3A is the simplified block diagram of FIG. 2 in which the RX link device sequentially exchanges multiple TX amplitude up or down commands with the TX link device, in accordance with at least some embodiments.

FIG. 3A is the simplified block diagram of FIG. 2 in which the RX link device 100B sequentially exchanges multiple TX amplitude up or down commands with the TX link device 100A, in accordance with at least some embodiments. For example, in some embodiments, the processing device of the RX link device 100B can determine that the amplitude of the main cursor is outside of a threshold percentage of the target amplitude. This threshold percentage (or amplitude range) can be pre-programmed and stored in the registers 154 and be an indication that several series of up or down commands may need to be sent to the TX link device 100A to more quickly arrive at the target amplitude in the received data signal. Thus, a processing device of the RX link device 100B can perform operations including generating multiple (or a burst of) up or down commands in response to the amplitude being outside of the threshold percentage of the target amplitude, generating multiple amplitude messages with the multiple up or down commands, and causing the multiple amplitude messages to be serially provided to the local transmitter (e.g., local TX 184) to be transmitted to the remote receiver (e.g., remote RX 104) of the TX link device 100B. These operations may be performed without reevaluating the amplitude in the receive data signal, so that moving the amplitude of the data signal transmitted by the TX link device 100A can happen more quickly knowing the amplitude of the data signal received at the RX link device 100B is a significant gap from the target amplitude.

Figure 3B:
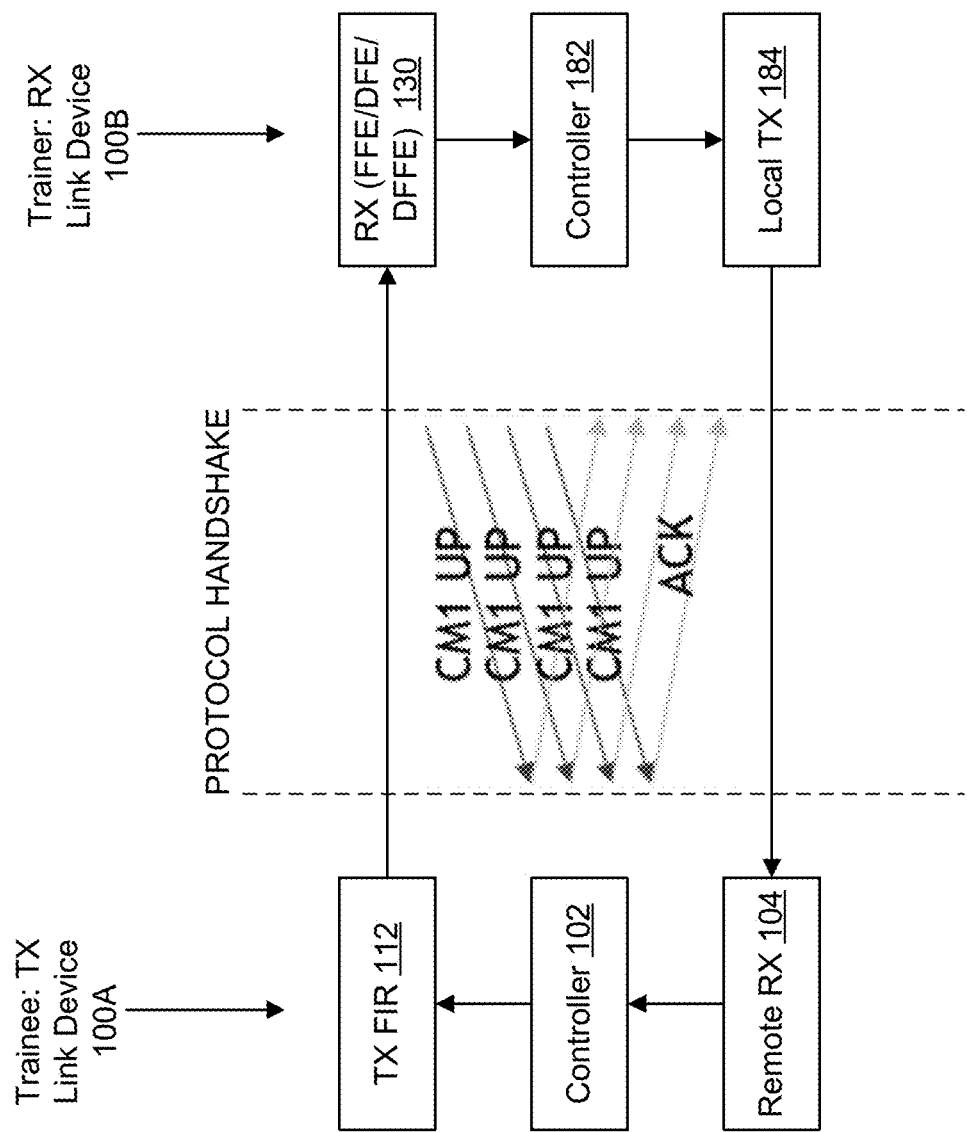
FIG. 3B is the simplified block diagram of FIG. 2 in which the RX link device sequentially exchanges multiple TX coefficient up or down commands with the TX link device, in accordance with at least some embodiments.

FIG. 3B is the simplified block diagram of FIG. 2 in which the RX link device 100B sequentially exchanges multiple TX coefficient up or down commands with the TX link device 100A, in accordance with at least some embodiments. For example, in some embodiments, the processing device of the RX link device 100B can determine that the RX pre-cursor tap value is much lower than, e.g., outside of a threshold percentage of, the target TX tap value. The processing device can then perform operations including generating multiple tap messages including multiple (or a burst of) up or down commands in response to the pre-cursor RX value being outside of the threshold percentage of the target RX tap value, and causing the multiple tap messages to be provided to the local transmitter (e.g., local TX 184) to be transmitted to the remote receiver (e.g., remote RX 104) of the TX link device 100A. These operations may be performed without reevaluating the full pre-cursor RX values, so that moving the TX pre-cursor value of the data signal transmitted by the TX link device 100A can happen more quickly knowing the pre-cursor RX value is a significant gap from the target RX tap value. These operations can also, of course, be performed for any pre-cursor value and any post-cursor value.

Figure 4A:
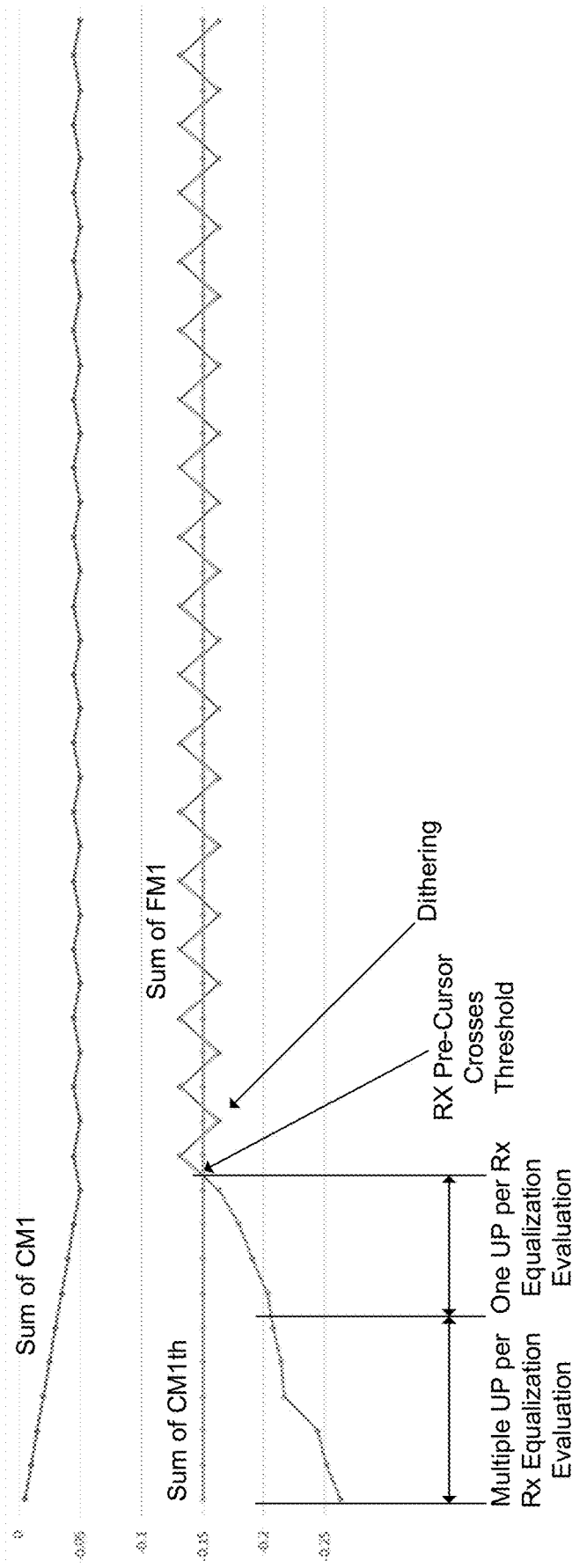
FIG. 4A is a graph of TX coefficients versus RX coefficients as training progresses when using a particular threshold for convergence for a first pre-cursor value, in accordance with at least some embodiments.

FIG. 4A is a graph of TX coefficients versus RX coefficients as training progresses when using a particular threshold for convergence for a first pre-cursor value, in accordance with at least some embodiments. In at least some embodiments, the processing device of the RX link device 100B further iteratively repeats the operations for the first RX pre-cursor value (FM1) that compares the first RX pre-cursor value against the first target RX tap value and generates additional up or down commands to cause adjustments to the corresponding first TX pre-cursor value (CM1), which brings the first RX pre-cursor value towards the target RX tap value, which is set as −0.15 in this example only for purposes of explanation. As illustrated, these can include a mixture of multiple (e.g., a burst) of up/down messages per RX equalization evaluation, as discussed with reference to FIGS. 3A-3B and individual up/down messages per RX equalization evaluation as discussed with reference to FIG. 2.

In various embodiments, as this process continues, in response to detecting the first RX pre-cursor value cross a threshold signal level of the target RX tap value, the processing device further performs operations including generating tap messages that alternatively include an up command and a down command, to cause the first RX pre-cursor value to dither about the RX target tap value. The operations can further include causing the tap messages to be provided to the local transmitter (e.g., local TX 184) to be transmitted to the remote receiver (e.g., remote RX 104) the TX link device 100B. The sum of the TX pre-cursor value (CM1) is illustrated in the top plot and the sum of the RX pre-cursor value (FM1) is illustrated in the bottom plot, both having corresponding behavior.

Figure 4B:
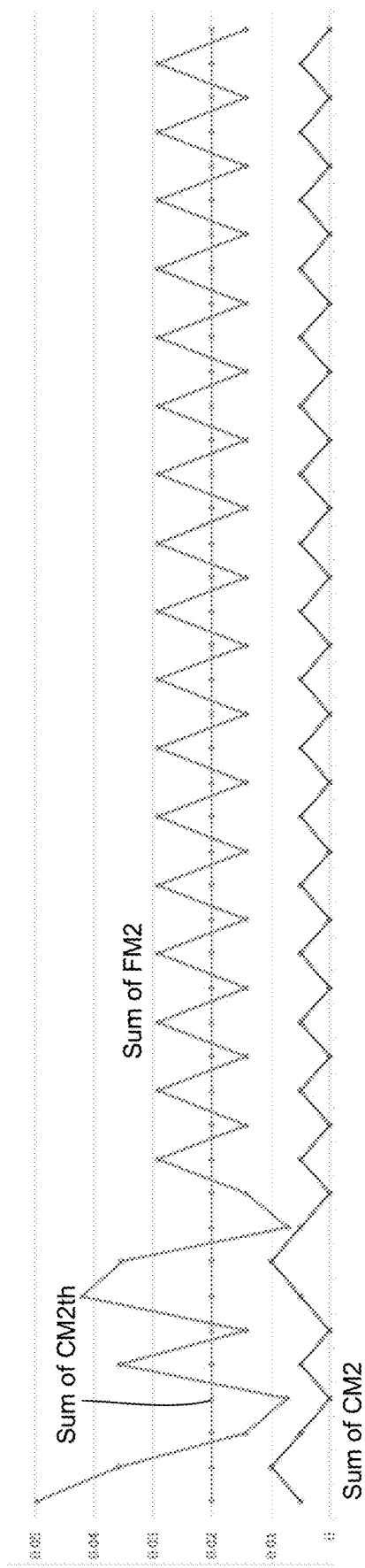
FIG. 4B is a graph of TX coefficients versus RX coefficients as training progresses when using a particular threshold for convergence for a second pre-cursor value, in accordance with at least some embodiments.

FIG. 4B is a graph of TX coefficients versus RX coefficients as training progresses when using a particular threshold for convergence for a second pre-cursor value, in accordance with at least some embodiments. For purposes of explanation only, in this example, the second target tap value for the second RX pre-cursor value (FM2) is set at +0.02, and a similar process as explain with reference to FIG. 4A can be performed to adjust the second corresponding TX pre-cursor value (CM2) until causing the second RX pre-cursor value (FM2) to dither around the second target tap value.

Figure 4C:
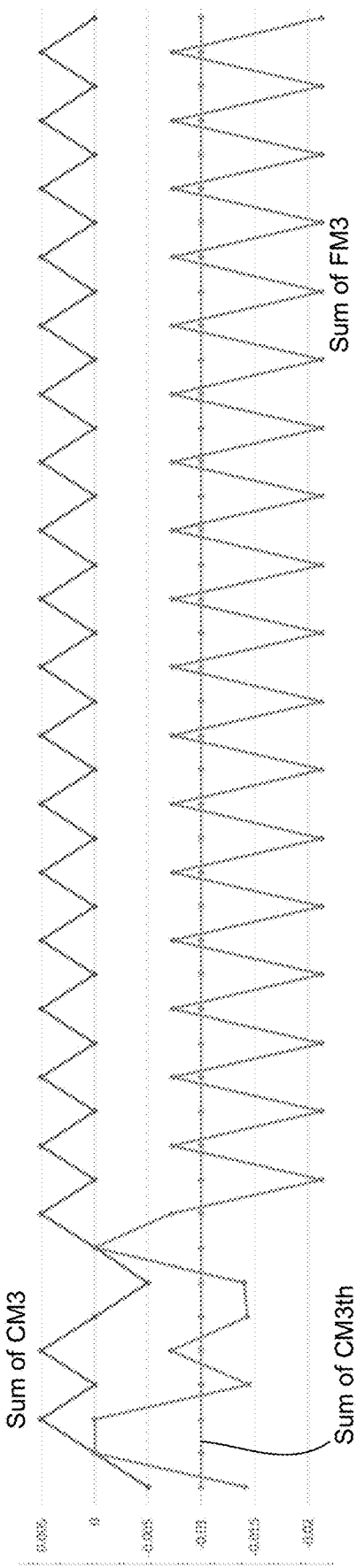
FIG. 4C is a graph of TX coefficients versus RX coefficients as training progresses when using a particular threshold for convergence for a third pre-cursor value, in accordance with at least some embodiments.

FIG. 4C is a graph of TX coefficients versus RX coefficients as training progresses when using a particular threshold for convergence for a third pre-cursor value, in accordance with at least some embodiments. For purposes of explanation only, in this example, the third target tap value for the second RX pre-cursor value (FM3) is set at −0.01, and a similar process as explain with reference to FIG. 4A can be performed to adjust the third corresponding TX pre-cursor value (CM3) until causing the third RX pre-cursor value (FM3) to dither around the second target tap value.

Figure 5:
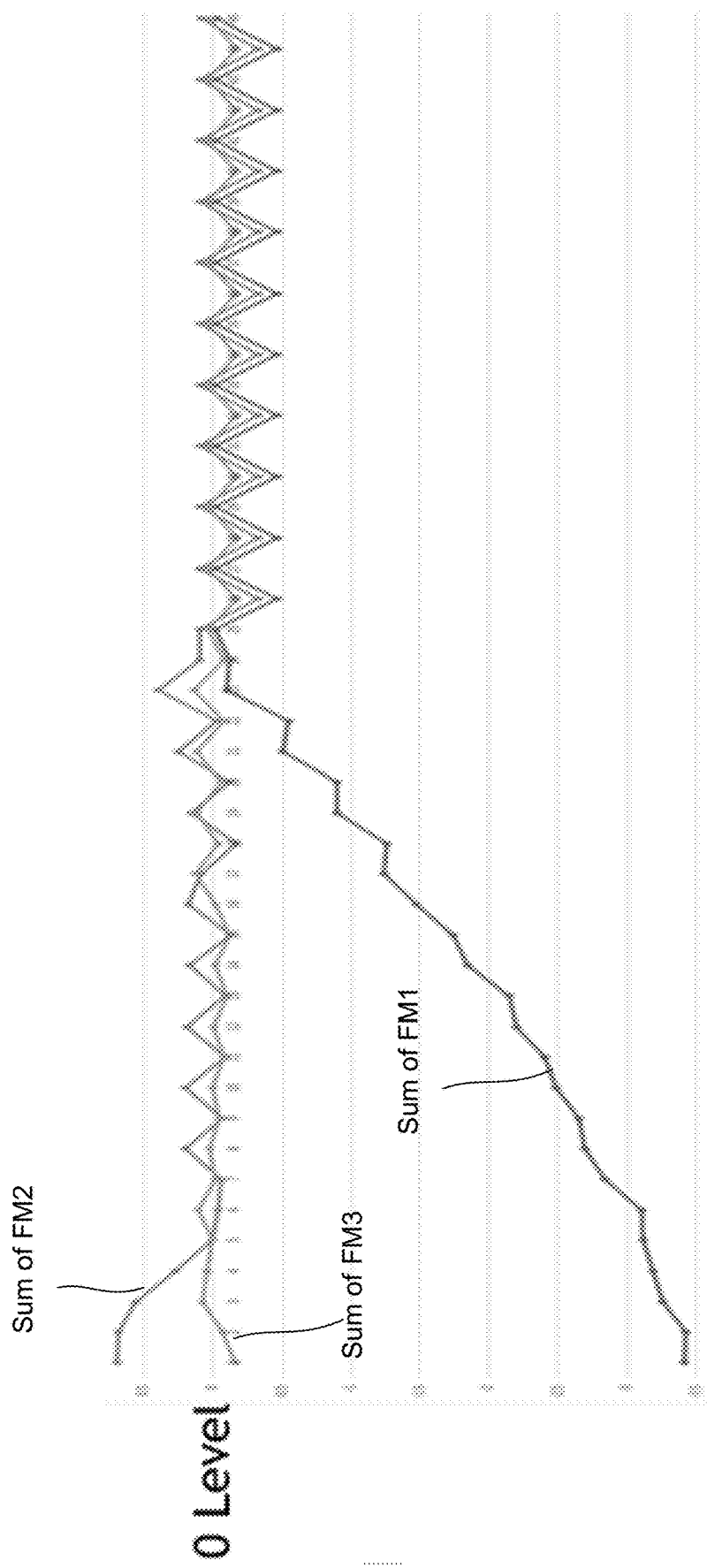
FIG. 5 is a graph of RX pre-cursor values as training completes to power down RX adaptation of the TX link device, in accordance with at least some embodiments.

FIG. 5 is a graph of RX pre-cursor values as training completes to power down RX adaptation of the TX link device 100A, in accordance with at least some embodiments. Because RX equalization performed by the one or more equalizers 142 can be power hungry, once training is completed to the point that the RX pre-cursor value(s) are dithering, as illustrated in FIGS. 4A-4B, then the microcontroller 150 can set the corresponding RX target tap value to zero. This can be performed for any of the first RX pre-cursor value (FM1), the second RX pre-cursor value (FM2), the third RX pre-cursor value (FM3), and so forth, enabling powering down the TX training selectively to save on power, with negligible impacts on performance from stopping the TX training. FIG. 5 illustrates the setting of each RX target tap values for each of FM1, FM2, and FM3 to zero in one embodiment only by way of example.

Figure 6:
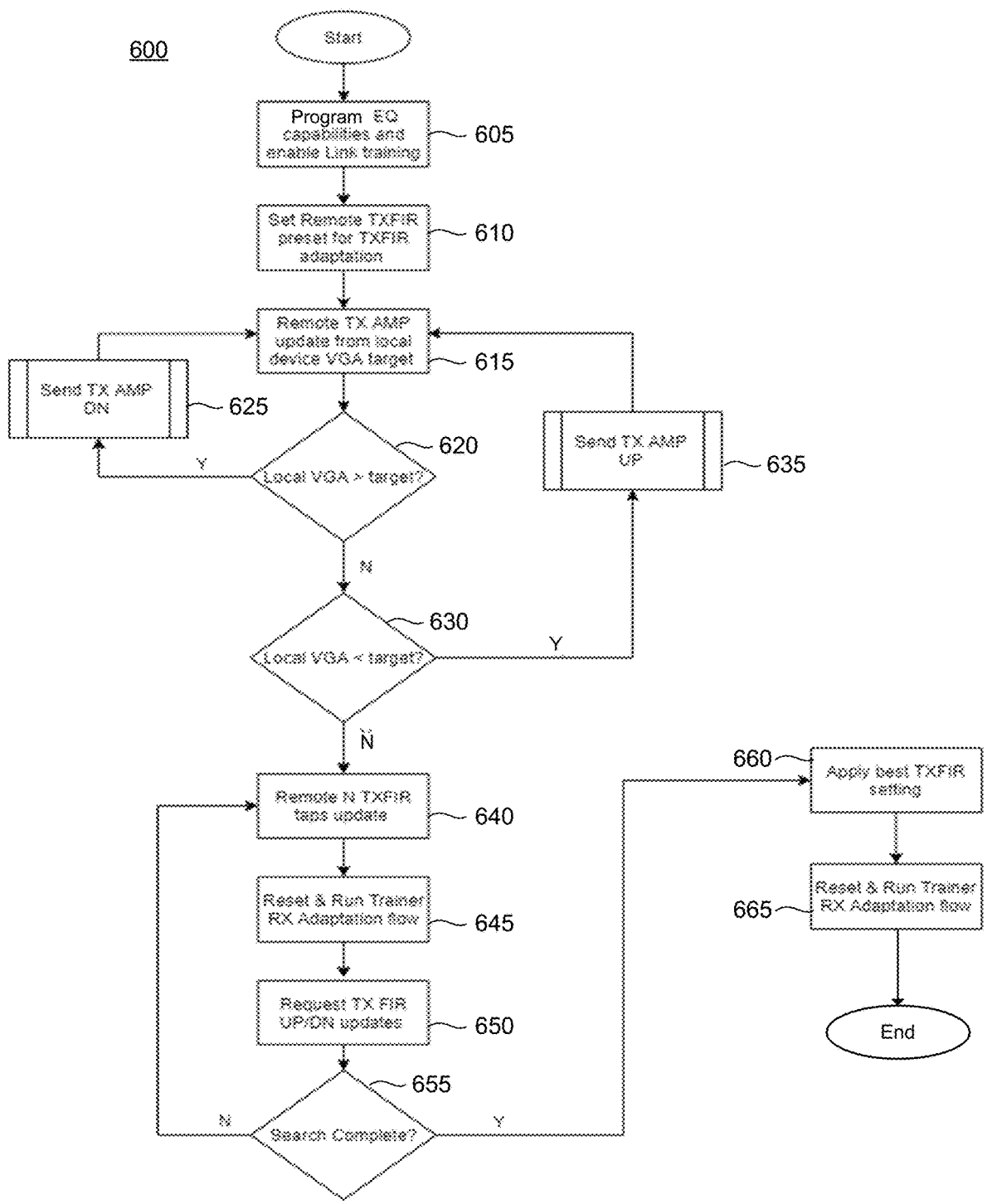
FIG. 6 is a flow diagram of a method for RX equalization-directed TX finite impulse (RX FIR) response adaptation, in accordance with at least some embodiments.

FIG. 6 is a flow diagram of a method 600 for RX equalization-directed TX finite impulse (RX FIR) response adaptation, in accordance with at least some embodiments. The method 600 can be performed by processing logic comprising hardware, software, firmware, or any combination thereof. For example, the method 600 can be performed by the RX link device 100B with particular emphasis on functionality of the microcontroller 150 and the RX system controller 182, also referred to herein as a processing device. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing logic programs the RX digital sub-system 140 with equalization (EQ) capabilities and parameters and enable link training. Enabling link training enables the Rx link device 100B to know that the data received is for training purposes and not yet to be processed or forwarded according to operational protocol.

Further, this programming can include programming the equalizer(s) 142 to perform certain type of or combination of types of equalization on the data signals received from the TX link device 100A, e.g., one or a combination of FFE, DFE, and DFFE. This programming can further include programming the registers 154 with different parameters in the RX hardware to assist with training and functional operation modes. The registers 154 can then provide status information for any external software program or external controller(s) to read into the link training or functional status of the RX link device 100B. This status information can include up or down commands or messages, which are provided to the RX system controller 182 to be encapsulated into protocol packets.

At operation 610, the processing logic sets or initiates the TX FIR 112 of the TX link device 100A for TX FIR adaptation. This can be performed by sending an equalization initiation command or the like to the remote RC 104 that, when parsed by the controller 102, is programmed as a setting into the TX FIR 112.

At operation 615, the processing logic begins performing adaptation of the TX 100A by retrieving a target amplitude (AMP) associated with a main cursor of the data signal that can be compared against an output of the VGA 134.

At operation 620, the processing logic determines whether the target amplitude is greater than the detected amplitude of the VGA 134. If yes, at operation 625, the processing logic generates an amplitude message including a down command to bring the amplitude closer to the target amplitude value. The processing logic also causes the amplitude message to be provided to a local transmitter (e.g., local TX 184) to be transmitted to a remote receiver (e.g., remote RX 104) of the TX link device 100A. In some embodiments, the target amplitude can be an amplitude range and reaching a value within the target amplitude range can be treated as satisfying the target amplitude for purposes of amplitude training of the TX link device 100A.

If, at operation 620, the processing logic determines the detected amplitude of the VGA 134 is not greater than the target amplitude, than at operation 630, the processing logic determines whether the detected amplitude of the VGA 134 is less than the target amplitude. If the answer is yes, at operation 635, the processing logic generates an amplitude message including an up command to bring the amplitude closer to the target amplitude value. The processing logic also causes the amplitude message to be provided to a local transmitter (e.g., local TX 184) to be transmitted to a remote receiver (e.g., remote RX 104) of the TX link device 100A. In some embodiments, the target amplitude can be an amplitude range and reaching a value within the target amplitude range can be treated as satisfying the target amplitude for purposes of amplitude training of the TX link device 100A.

If, at operation 630, the processing logic determines the detected amplitude of the VGA 134 is not less than the target amplitude, than the detected amplitude is at the target amplitude (or within the target amplitude range) and the method 600 transitions to operation 640. The functioning of operations 615-635 (amplitude equalization) is also explained in more detail with reference to FIG. 2, FIG. 3A, and FIG. 7.

At operation 640, the processing logic causes adaptation of a TX pre-cursor (or post-cursor) value by causing one or more (e.g., N) up or down commands to be sent depending on how close an RX pre-cursor (or post-cursor) values is to a target RX tap value. This TX FIR adaptation by the RX link device 100A is discussed in more detail with reference to FIG. 2, FIG. 3B, and FIG. 8.

At operation 645, the processing logic resets and re-runs the trainer RX adaptation flow of operations 615 through 640 for an additional pre-cursor or post-cursor coefficient value. At operation 650, the processing logic can perform evaluation to determine whether another RX pre-cursor value (or RX post-cursor value) is greater or less than an RX tap target value (or range of values) that also needs to be updated for TX FIR adaptation. If there is, then operations 640 and 650 are repeated.

For example, at operation 655, the processing logic determines (e.g., evaluates) whether there are any additional RX pre-cursor (or RX post-cursor) coefficient value that is greater or less than a corresponding target RX tap value, which can be performed as a search using the one or more equalizers 142 and a comparison with the corresponding RX tap value. If this search results in an additional RX coefficient value that needs adaptation, the method 600 loops back to operation 640 and continues with further adaptation.

If, at operation 655 there are no additional RX coefficient values that need TX FIR-based adaptation, then the processing logic of the TX link device 100A, at operation 660, applies the best TX pre-cursor (and/or post-cursor) coefficient values in further communication with the RX link device 100B, e.g., now that training has been completed. At operation 665, the processing logic resets and re-runs the trainer RX adaptation flow in response to passing a particular time interval or in response to an intermittent check that results in detecting the amplitude and/or the RX coefficient values of the RX link device 100B have drifted sufficiently (e.g., within 5-10%) away from the target amplitude or RX tap values, respectively.

Figure 7:
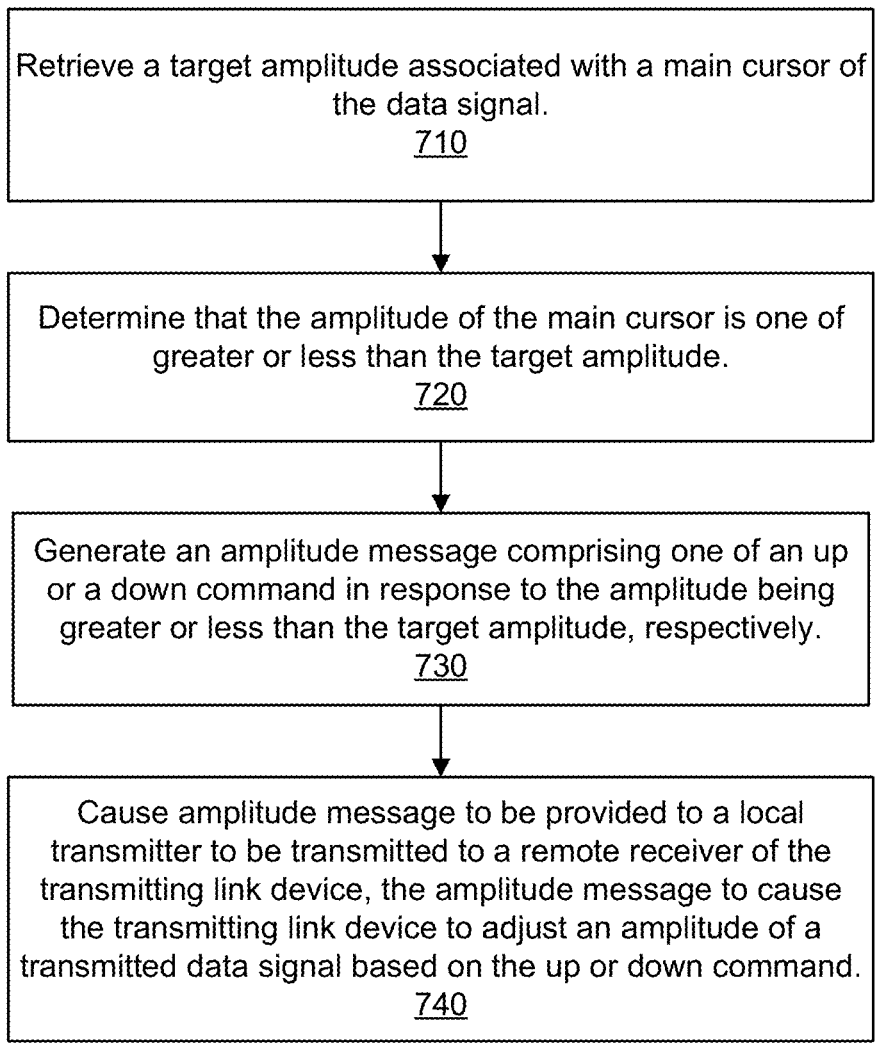
FIG. 7 is a flow diagram of a method for amplitude RX equalization-directed TX finite impulse response (FIR) adaptation, in accordance with at least some embodiments.

FIG. 7 is a flow diagram of a method 700 for amplitude RX equalization-directed TX finite impulse response (FIR) adaptation, in accordance with at least some embodiments. The method 700 can be performed by processing logic comprising hardware, software, firmware, or any combination thereof. For example, the method 700 can be performed by the RX link device 100B with particular emphasis on functionality of the microcontroller 150 and the RX system controller 182, also referred to herein as a processing device. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic retrieves e.g., from the registers 154, a target amplitude associated with a main cursor of a data signal received from a TX link device.

At operation 720, the processing logic determines that the amplitude of the main cursor is one of greater or less than the target amplitude.

At operation 730, the processing logic generates an amplitude message including one of an up or a down command in response to the amplitude being greater or less than the target amplitude, respectively.

At operation 740, the processing logic causes the amplitude message to be provided to a local transmitter to be transmitted to a remote receiver of the transmitting link device, where the amplitude message is to cause the transmitting link device to adjust an amplitude of a transmitted data signal based on the up or down command.

FIG. 8 is a flow diagram of a method 800 for tap coefficient RX equalization-directed TX FIR response adaptation, in accordance with at least some embodiments. The method 800 can be performed by processing logic comprising hardware, software, firmware, or any combination thereof. For example, the method 800 can be performed by the RX link device 100B with particular emphasis on functionality of the microcontroller 150 and the RX system controller 182, also referred to herein as a processing device. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the processing logic programs a receiver (RX) of a receiving link device with information related to target RX tap values that are associated with at least one of RX pre-cursors or RX post-cursors.

At operation 820, the processing logic detects, using an equalizer of the receiver, that an RX pre-cursor value derived from a data signal received from a transmitting link device is one of greater or less than a target RX tap value.

At operation 830, the processing logic generates, based on the detecting at operation 820, a tap message comprising one of an up or a down command to one of decrease or increase a corresponding transmitter (TX) pre-cursor value of the transmitting link device.

At operation 840, the processing logic causes the tap message to be provided to a local transmitter to be transmitted to a remote receiver of the transmitting link device, wherein the tap message is to cause the transmitting link device to adjust the corresponding TX pre-cursor value. While operations 810 through 840 are discussed with reference to RX/TX pre-cursor value, these operations can also be applied to RX/TX post-cursor values, as previously discussed.

In at least some embodiments, the processing logic can iterate through operations 810 through 840 (similar to as was discussed with reference to operations 640 through 655 of FIG. 6) until the RX pre-cursor value reaches the target RX tap value or is within a threshold percentage of the target RX tap value. Though these iterations, the amplitude of the TX data signal can be decreased potentially to where the data signal becomes susceptible to noise and crosstalk and becomes more difficult to detect.

Thus, in at least some embodiments, the processing logic iteratively repeats the detecting, the generating, and the causing operations 820, 830, and 840 for a first RX pre-cursor value, a second RX pre-cursor value, and a third RX pre-cursor value. The processing logic further, during each iteration, determines an absolute sum of the first RX pre-cursor value, the second RX pre-cursor value, and the third RX pre-cursor value in one embodiment. In an alternative embodiment, the processing logic instead, during each iteration, determines the absolute sum of a change in the first RX pre-cursor value, a change in the second RX pre-cursor value, and a change in the third RX pre-cursor value. The processing logic further, in response to the absolute sum falling below a threshold level or other predetermined minimum value, as expressed in Equation (1), terminates the iteratively repeating. Performing these operations only until the outer eye falls below a preset threshold can ensure that the TX link device 100A does not become susceptible to noise or crosstalk, and thus remain detectable.

$$\Sigma_{k,k=-3,-2,-1} |f(x)| < \text{threshold} \tag{1}$$

$$\Sigma_{k,k=-3,-2,-1} |f(x)w(k)| < \text{threshold} \tag{2}$$

In an extension to these embodiments, the absolute sum is an absolute sum of weighted values of the first RX pre-cursor value, the second RX pre-cursor value, and the third RX pre-cursor value, as expressed in Equation (2), where $w(k)$ are the weight values. As one example, $w(-1)$ could be 1, $w(-2)$ could be ½, $w(-3)$ could be ¼ in one embodiment. In another embodiment, $w(-1)$ could be 1.5, $w(-2)$ cold be 1, and $w(-3)$ could be ¾, for example, although other examples are envisioned. Further, these extended operations could also be applied to post-cursors or used in conjunction with others of the disclosed embodiments. Further, because the disclosed embodiments train the TX FIR coefficients of the TX 110A of the TX link device 100A, other solution spaces or protocols that the TX system controller 102 may direct would also be acceptable and not impact the functionality of the present training solutions directed by the RX link device 100B.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A receiving link device for use with a transmitting link device having a remote receiver, the receiving link device comprising:
   a receiver (RX) to receive a data signal from the transmitting link device, wherein the receiver comprises an equalizer to detect RX tap values derived from the data signal;
   a local transmitter coupled to the receiver; and
   a processing device coupled to the receiver and the local transmitter, the processing device to perform operations comprising:
     programming the receiver with information related to target RX tap values that are associated with at least one of RX pre-cursors or RX post-cursors;
     detecting, using the equalizer, that an RX pre-cursor value is outside of a threshold value based on a target RX tap value;
     generating, based on the detecting, a plurality of tap messages comprising a plurality of up or down commands to one of decrease or increase a corresponding transmitter (TX) pre-cursor value of the transmitting link device; and
     causing the plurality of tap messages to be provided to the local transmitter to be transmitted to the remote receiver, wherein the plurality of tap messages is to cause the transmitting link device to adjust the corresponding TX pre-cursor value.

2. The receiving link device of claim 1, wherein the equalizer is at least one of a feed-forward equalizer, a decision feedback equalizer, or a decision feed-forward equalizer, the RX pre-cursor value is one of a set of feed-forward or feedback equalization coefficients of the equalizer, and the corresponding TX pre-cursor value is one of a set of TX finite impulse response (FIR) coefficients of the transmitting link device.

3. The receiving link device of claim 1, wherein the operations further comprise:
   detecting, using the equalizer, that an RX post-cursor value is one of greater or less than a second target RX tap value;
   generating a second tap message comprising one of an up or a down command to one of decrease or increase a corresponding TX post-cursor value of the transmitting link device; and
   causing the second tap message to be provided to the local transmitter to be transmitted to the remote receiver of the transmitting link device.

4. The receiving link device of claim 1, wherein the plurality of tap messages include a burst of the plurality of up or down commands.

5. The receiving link device of claim 1, wherein the operations further comprise:
   iteratively repeating the detecting, the generating, and the causing for the RX pre-cursor value; and
   in response to detecting the RX pre-cursor value cross a threshold signal level of the target RX tap value:
     generating tap messages that alternatively comprise an up command and a down command, to cause the RX pre-cursor value to dither about the RX target tap value; and
     causing the tap messages to be provided to the local transmitter to be transmitted to the remote receiver the transmitting link device.

6. The receiving link device of claim 1, wherein the operations further comprise:
   iteratively repeating the detecting, the generating, and the causing for a first RX pre-cursor value, a second RX pre-cursor value, and a third RX pre-cursor value;
   during each iteration, determining an absolute sum of a change of the first RX pre-cursor value, a change of the second RX pre-cursor value, and a change of the third RX pre-cursor value; and
   in response to the absolute sum falling below a threshold level, terminating the iteratively repeating.

7. The receiving link device of claim 6, wherein the absolute sum is an absolute sum of weighted values of the first RX pre-cursor value, the second RX pre-cursor value, and the third RX pre-cursor value.

8. The receiving link device of claim 1, wherein the operations further comprise:
   iteratively repeating the detecting, the generating, and the causing for the RX pre-cursor value, wherein the RX pre-cursor value is one of a first RX pre-cursor value, a second RX pre-cursor value, and a third RX pre-cursor value;
   detecting that the RX pre-cursor value is below a predetermined minimum value;
   setting the RX target tap value to zero; and
   in response to the setting, terminating the iteratively repeating of the detecting, the generating, and the causing for the RX pre-cursor value.

9. The receiving link device of claim 1, wherein the receiver further comprises:
   a continuous-time linear equalizer (CTLE); and
   a variable gain amplifier (VGA) coupled to the CTLE; and
   wherein the equalizer is a digital equalizer coupled to the VGA.

10. A receiving link device for use with a transmitting link device having a remote receiver, the receiving link device comprising:
    a receiver (RX) to receive a data signal from the transmitting link device, wherein the receiver comprises a variable gain amplifier (VGA) to detect an amplitude of the data signal;
    a local transmitter coupled to the receiver; and
    a processing device coupled to the receiver and the local transmitter, the processing device to perform operations comprising:
      retrieving a target amplitude associated with a main cursor of the data signal;
      determining that the amplitude of the main cursor is outside of a threshold value based on the target amplitude;
      generating a plurality of amplitude messages comprising a plurality of up or down commands in response to the amplitude being outside of the threshold value based on the target amplitude; and causing the plurality of amplitude messages to be serially provided to the local transmitter to be transmitted to the remote receiver, wherein the plurality of amplitude messages is to cause the transmitting link device to adjust an amplitude of a transmitted data signal based on the plurality of up or down commands.

11. The receiving link device of claim 10, wherein the operations further comprise generating the plurality of up or down commands in response to the amplitude being outside of the threshold value based on the target amplitude.

12. The receiving link device of claim 10, wherein the receiver further comprises an equalizer coupled to the VGA, wherein the equalizer is at least one of a feed-forward equalizer, a decision feedback equalizer, or a decision feed-forward equalizer, and is to detect tap values derived from the data signal, and wherein the operations further comprise:

programming the receiver with target RX tap values associated with at least one of RX pre-cursors or RX post-cursors;

detecting, using the equalizer, that an RX pre-cursor value is one of greater or less than a target RX tap value;

generating, based on the detecting, a tap message comprising one of an up or a down command to one of decrease or increase a corresponding transmitter (TX) pre-cursor value of the transmitting link device; and causing the tap message to be provided to the local transmitter to be transmitted to the remote receiver of the transmitting link device, wherein the tap message is to cause the transmitting link device to adjust the corresponding TX pre-cursor value.

13. A method comprising:

programming, by a processing device, a receiver (RX) of a receiving link device with information related to target RX tap values that are associated with at least one of RX pre-cursors or RX post-cursors;

detecting, by the processing device using an equalizer of the receiver, that an RX pre-cursor value derived from a data signal received from a transmitting link device is outside of a threshold value based on a target RX tap value;

generating, by the processing device based on the detecting, a plurality of tap messages comprising a plurality of up or down commands to one of decrease or increase a corresponding transmitter (TX) pre-cursor value of the transmitting link device; and causing, by the processing device, the plurality of tap messages to be provided to a local transmitter to be transmitted to a remote receiver of the transmitting link device, wherein the plurality of tap messages is to cause the transmitting link device to adjust the corresponding TX pre-cursor value.

14. The method of claim 13, wherein the equalizer is at least one of a feed-forward equalizer, a decision feedback equalizer, or a decision feed-forward equalizer, the RX pre-cursor value is one of a set of feed-forward or feedback equalization coefficients of the equalizer, and the corresponding TX pre-cursor value is one of a set of TX finite impulse response (FIR) coefficients of the transmitting link device.

15. The method of claim 13, further comprising:

detecting, using the equalizer, that a RX post-cursor value is one of greater or less than a second target RX tap value;

generating a second tap message comprising one of an up or a down command to one of decrease or increase a corresponding TX post-cursor value of the transmitting link device; and causing the second tap message to be provided to the local transmitter to be transmitted to the remote receiver of the transmitting link device.

16. The method of claim 13, wherein the plurality of tap messages include a burst of the plurality of up or down commands.

17. The method of claim 13, further comprising:

iteratively repeating the detecting, the generating, and the causing for the RX pre-cursor value; and in response to detecting the RX pre-cursor value cross a threshold signal level of the target RX tap value:

generating tap messages that alternatively comprise an up command and a down command, to cause the RX pre-cursor value to dither about the RX target tap value; and causing the tap messages to be provided to the local transmitter to be transmitted to the remote receiver the transmitting link device.

18. The method of claim 13, further comprising:

iteratively repeating the detecting, the generating, and the causing for a first RX pre-cursor value, a second RX pre-cursor value, and a third RX pre-cursor value;

during each iteration, determining an absolute sum of the first RX pre-cursor value, the second RX pre-cursor value, and the third RX pre-cursor value; and in response to the absolute sum falling below a threshold level, terminating the iteratively repeating.

19. The method of claim 18, wherein the absolute sum is an absolute sum of weighted values of the first RX pre-cursor value, the second RX pre-cursor value, and the third RX pre-cursor value.

20. The method of claim 13, further comprising:

iteratively repeating the detecting, the generating, and the causing for the RX pre-cursor value, wherein the RX pre-cursor value is one of a first RX pre-cursor value, a second RX pre-cursor value, and a third RX pre-cursor value;

detecting that the RX pre-cursor value is below a predetermined minimum value;

setting the RX target tap value to zero; and in response to the setting, terminating the iteratively repeating of the detecting, the generating, and the causing for the RX pre-cursor value.

* * * * *